(12) United States Patent
Schmidt et al.

(10) Patent No.: US 7,390,982 B2
(45) Date of Patent: Jun. 24, 2008

(54) CONTACTLESS INTUITIVE SEAT ADJUSTER CONTROL

(75) Inventors: Robert M. Schmidt, Livonia, MI (US); James B. Wright, Sterling Heights, MI (US); Charles B. Banter, Northville, MI (US)

(73) Assignee: Lear Corporation, Southfield, MI (US)

( * ) Notice: Subject to any disclaimer, the term of this patent is extended or adjusted under 35 U.S.C. 154(b) by 481 days.

(21) Appl. No.: 10/943,531

(22) Filed: Sep. 17, 2004

(65) Prior Publication Data

US 2006/0061315 A1   Mar. 23, 2006

(51) Int. Cl.
*H01H 9/00* (2006.01)

(52) U.S. Cl. .............. 200/5 R; 200/600; 307/10.1; 218/466; 218/568

(58) Field of Classification Search .......... 200/600, 200/5 A, 5 R, 17 R, 18; 318/282, 286, 380, 318/266, 466–468, 568; 400/490, 494; 307/9.1, 307/10.1

See application file for complete search history.

(56) References Cited

U.S. PATENT DOCUMENTS

| | | | |
|---|---|---|---|
| 4,473,724 A * | 9/1984 | Suzuki | 200/5 R |
| 4,675,587 A | 6/1987 | Sugiyama | |
| 4,888,535 A | 12/1989 | Brusasco | |
| 4,907,153 A | 3/1990 | Brodsky | |
| 5,019,765 A | 5/1991 | Ogasawara | |
| 5,126,640 A | 6/1992 | Leroy | |
| 5,278,363 A * | 1/1994 | Krieg et al. | 200/5 R |
| 5,285,139 A | 2/1994 | Ogasawara | |
| 5,668,357 A * | 9/1997 | Takiguchi et al. | 200/5 R |
| 5,784,036 A * | 7/1998 | Higuchi et al. | 345/7 |
| 5,844,182 A | 12/1998 | Hirano et al. | |
| 5,864,105 A * | 1/1999 | Andrews | 200/5 R |
| 6,040,533 A | 3/2000 | Wagner | |
| 6,088,642 A * | 7/2000 | Finkelstein et al. | 701/49 |
| 6,098,000 A * | 8/2000 | Long et al. | 701/49 |
| 6,118,434 A * | 9/2000 | Nishitani et al. | 345/173 |
| 6,183,257 B1 * | 2/2001 | Ho | 434/131 |
| 6,774,505 B1 * | 8/2004 | Wnuk | 307/10.8 |
| 6,894,234 B1 * | 5/2005 | Sottong | 200/5 R |
| 2005/0006939 A1 * | 1/2005 | Hancock et al. | 297/354.12 |
| 2005/0134116 A1 * | 6/2005 | Hein et al. | 307/10.1 |
| 2007/0108809 A1 * | 5/2007 | Kurrasch et al. | 297/217.3 |

FOREIGN PATENT DOCUMENTS

| | | |
|---|---|---|
| DE | 4405566 | 8/1995 |
| DE | 19522897 | 1/1997 |
| DE | 19725175 | 12/1998 |
| DE | 19729866 | 1/1999 |
| DE | 19731053 | 1/1999 |
| DE | 19933769 | 1/2001 |
| DE | 10003614 | 8/2001 |
| DE | 10151448 | 5/2002 |

* cited by examiner

*Primary Examiner*—K. Richard Lee
(74) *Attorney, Agent, or Firm*—MacMillan, Sobansk & Todd, LLC

(57) ABSTRACT

A controller for selectively adjusting a power seat includes a seat adjuster including a base panel, a stepped panel extending laterally from a surface of the base panel, selector areas inclined with respect to and extending between the base panel and the stepped panel and along at least a portion of a periphery of the stepped panel. Multiple spaced depressions are formed on an outer surface of the selector areas. A contactless sensor is secured to an inner surface of the selector areas at each a depression, each sensor selectively producing a signal representing a seat adjustment function.

20 Claims, 4 Drawing Sheets

CONTACTLESS INTUITIVE SEAT ADJUSTER CONTROL

BACKGROUND OF THE INVENTION

The invention relates to a control for adjusting a power seat. More particularly, the invention pertains to a control panel containing sensors, which activate a seat adjustment mechanism without requiring tactile contact.

DESCRIPTION OF THE RELATED ART

Vehicle seat adjuster control devices typically require displacing a control knob by rotation or translation, depressing a control button, or sliding a mechanical or electro-mechanical control sensor to operate various electric motors that adjust the seat position, tilt the seat, and adjust the location and disposition of the seat surface relative to the seat back.

In addition to push button switches, piezoelectric elements have been used for seat adjuster user interfaces, touch pads and sensors. Piezoelectric elements exhibit a dielectric change when tension or compression mechanically distorts the piezoelectric element. The piezoelectric element may generate electrical charges when mechanically distorted, which usually is caused by pressure or vibration exerted on the piezoelectric element. However, a drawback with using a piezoelectric element for vehicle sensor actuation is that vibrations from the vehicle or road surfaces may result in an unintended sensor actuation.

Capacitive sensors have also been used for sensor actuation in a motor vehicle. A capacitive sensor located under a surface fascia creates an electric field above the fascia. If an object enters the electric field, a change of capacitance may be sensed to indicate a request by an operator to actuate the respective sensor. Because the capacitive sensors are typically mounted under the surface of the fascia unit, activation of a sensor may occur when an object is inadvertently placed on or in close proximity to the sensor. This ultimately can lead to activation of a device that was not intended. Furthermore, if the capacitive sensors are placed in close proximity to one another, overlapping electrical fields may occur which may also lead to activation of a sensor adjacent to the sensor intended for activation.

Previously contactless sensors have been mounted in an array on a flat surface, whose use relies on visual clues to select and activate the desired function. But the power seat of a motor vehicle is usually adjusted by an operator whose vision of the control panel is indirect, obscured, or nonexistent. Therefore, it is desired that seat adjustment occur without need for the operator to observe the actuation of any sensor. Instead, the operator preferably would select each sensor intuitively due its being located in a position that normally would be associated by a seated operator with the desired seat adjustment. Furthermore, the seat preferably would be adjusted without need to apply manual force to a control. Instead, the control sensors would be contactless, requiring only the operator to move a finger into an electric field surrounding the selected sensor without manual contact with the sensor.

SUMMARY OF THE INVENTION

The present invention has the advantage of providing contactless sensors in a power seat adjuster control. The sensors control the motion of power seat drivers, which alter the position of the seat and the relative position of seat components. The control is located in a seat side shield readily accessible to a seated operator without need for direct sight of the controller.

The control touch points are spaced and shaped to match the form and operation of the human hand. Seat adjustment functions are selected preferably by the thumb and fingers of the operator's hand that is closest to the seat side shield. The control requires no manual force to activate it and no visual clues to operate it. Its operation is intuitive and ergonomic.

A controller for adjusting a power seat according to this invention includes a seat adjuster having a base panel, a stepped panel extending laterally from a surface of the base panel, and selector areas inclined with respect to and extending between the base panel and the stepped panel and along at least a portion of a periphery of the stepped panel. Multiple spaced depressions are formed on an outer surface of the selector areas. A contactless sensor is secured to an inner surface of the selector areas at each a depression, each sensor selectively producing a signal representing a seat adjustment function. Preferably, the contactless sensors are field effect sensors. A lumbar adjuster formed integrally with the base panel includes sensors for increasing and decreasing the degree of support provided to the lumbar regions of the seat assembly.

The depressions on the outer surface of the controller provide the operator with visual and tactile indications of the corresponding sensor's location on the inner surface of the seat adjuster. The location of each depression on the stepped, inclined selector surfaces of the controller correspond intuitively to the function produced by the corresponding sensor. For example, sensors that cause the seat assembly and the seat front and back to move upward are located on downward facing surfaces of the control panel; sensors for moving the seat assembly, and the seat front and back downward are located on upward facing surfaces; the seat assembly moves forward when a sensor located on a rear facing surface is actuated, and rearward when a sensor located on a forward facing surface is actuated.

DETAILED DESCRIPTION OF THE PREFERRED EMBODIMENT

Figure 1:
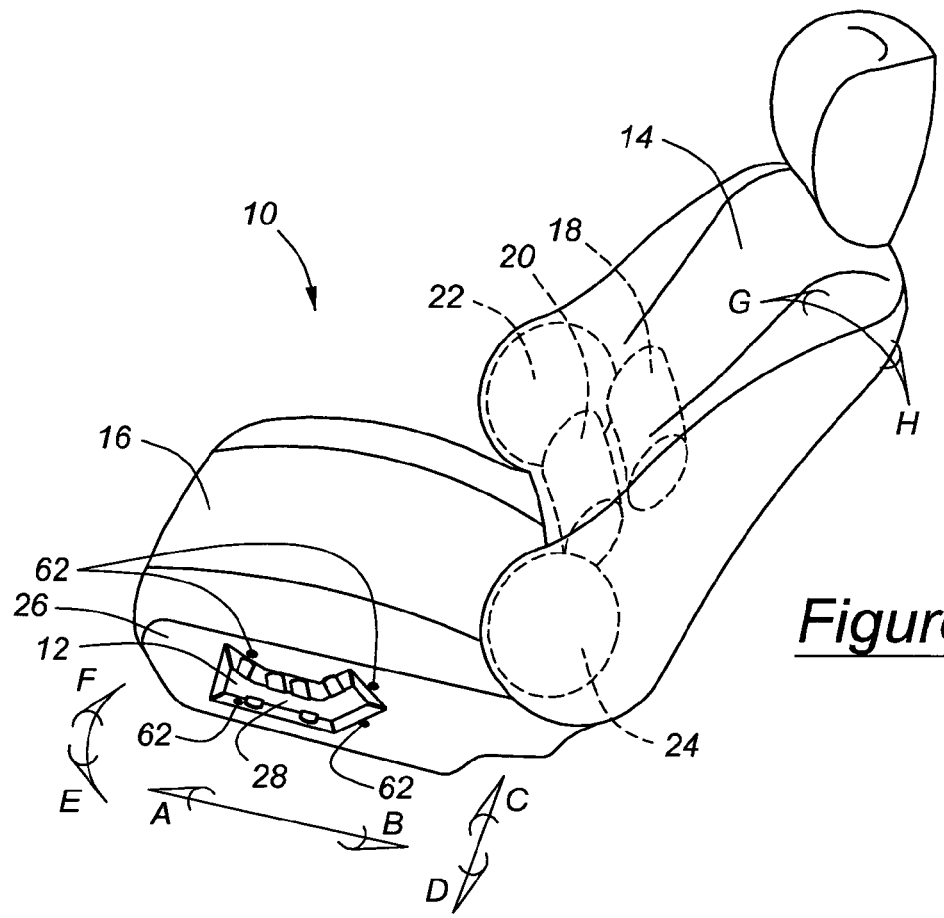
FIG. 1 is an isometric side view of a power seat assembly showing the location of a seat adjuster control panel.

Referring now to the drawings, there is illustrated in FIG. 1 a power seat assembly 10 for a motor vehicle, to which a seat adjuster control panel 12 of this invention may be applied. The seat assembly 10 includes a cushioned back 14, a cushioned seat 16, upper and lower lumbar supports 18, 20, and inner and outer lateral supports 22, 24. The seat assembly is moved as a unit forward and rearward A-B, upward and downward C-D automatically by motors in response to selections made through a seat adjuster control panel 12, mounted preferably on the seat side shield adjacent an outboard surface of the seat assembly. The seat shield is located in a space between the inside door panel and the outer later surface of the seat assembly. The tilted disposition E-F of the seat assembly 10 is also adjusted automatically by motors, which alternately raise and lower the front and rear of the seat 14. Similarly, the seat back 14 is tilted forward and backward G-H in relation to the cushioned seat 16 in response to selections made through a control panel. The lumbar supports 18, 20 and lateral supports 22, 24 are stiffened and relaxed individually by pressurizing and venting pneumatic bladders.

Preferably, the motors are actuated by field effect sensors, also referred to as touch sensors, mounted on the seat adjuster control panel. The touch sensors, which are activated without need for physical contact, produce a signal indicating a desire to change the position of the seat assembly corresponding to the actuated touch sensor. Each touch sensor functions as a switch, which opens and closes a connection between a source of electric power and the motor that corresponds to the activated sensor. Alternatively, the motors are actuated by contact switches, which perform the same function as the touch sensors.

Figure 2:
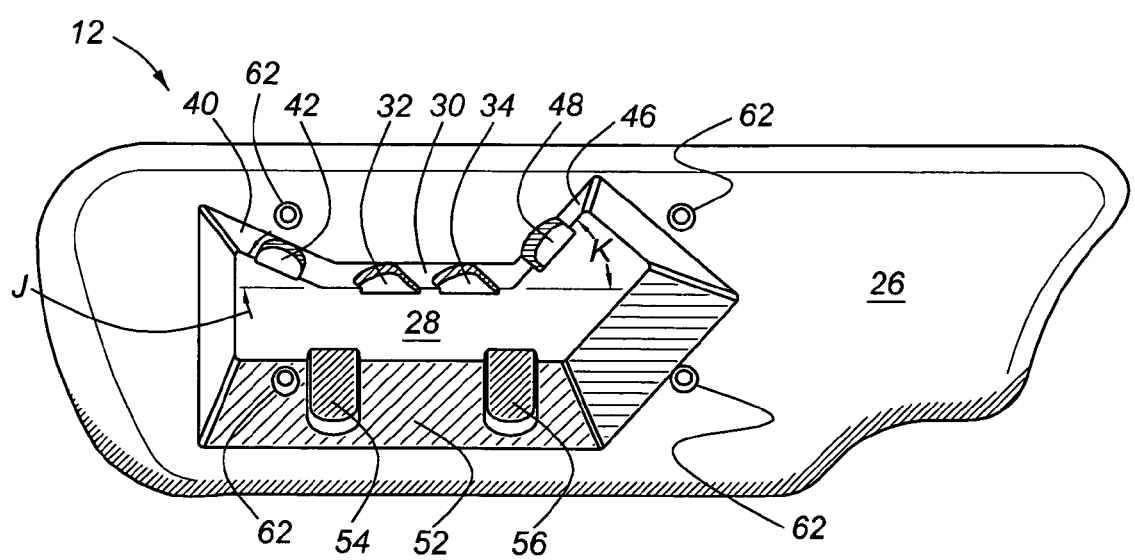
FIG. 2 is a front view of a power seat adjuster control panel.
Figure 3:
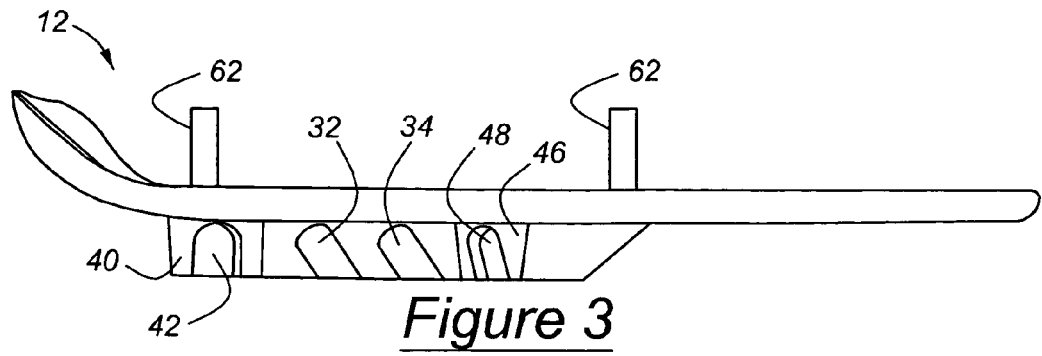
FIG. 3 is a top view of the control panel of FIG. 2.
Figure 4:
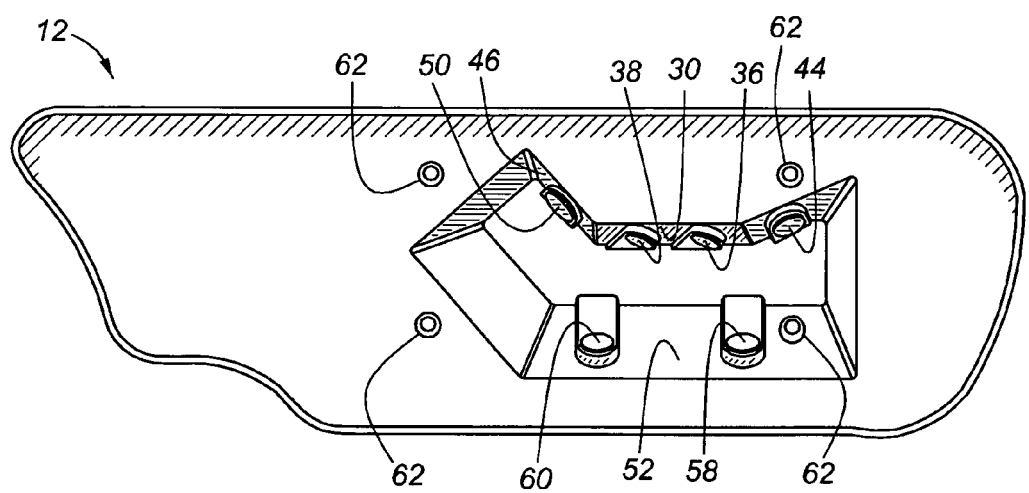
FIG. 4 is a back view of the control panel of FIG. 2.

Referring to FIGS. 2-4, a six-way seat adjuster control 12 includes a base panel 26 located adjacent the contour of the side of the seat 16, a panel 28 located laterally outward and stepped from the outer surface of panel 26, and selector areas inclined with respect to panels 26 and 28. Alternatively, panel 28 may be recessed with respect to panel 26. Each selector area is bounded along opposite lateral edges by panels 26 and 28 and extends along at a portion of the periphery of stepped panel 28. The seat adjuster control panel 12 includes a first selector area 30 formed with hollows or depressions 32, 34 on its outer surface, and sensors 36, 38, each mounted on the inner surface of panel 30 opposite a respective depression 32, 34. Preferably, sensor 36 is associated with moving the front of seat 16 downward, and sensor 38 is associated with moving the rear of the seat downward. When both sensors 36, 38 are activated concurrently, the seat assembly 10 moves downward without changing the angular disposition of the seat 16 or back 14.

A rearward facing selector area in the form of a ramp 40, located forward of plane 30 and extending from surfaces 26 and 28, is inclined at an angle J forward and upward relative to area 30. Ramp 40 is formed with a depression 42 on its outer surface and a corresponding sensor 44 on its inner surface. Sensor 44 is preferably associated with moving the seat assembly 10 forward.

A forward facing selector area in the form of ramp 46, located rearward of plane 30 and extending from surfaces 26 and 28, is inclined at an angle K rearward and upward relative to area 30. Ramp 46 is formed with a depression 48 on its outer surface and a corresponding sensor 50 on its inner surface. Sensor 50 is preferably associated with moving the seat assembly 10 rearward.

The seat adjuster control 12 further includes another selector area 52 formed with depressions 54, 56 on its outer surface, and supporting sensors 58, 60, each mounted on the inner surface of plane 52 opposite a respective depression. Preferably, sensor 58 is associated with moving the front of seat 16 upward, and sensor 60 is associated with moving the rear of the seat upward. When both sensors 58, 60 are activated concurrently, the seat assembly 10 moves upward without changing the angular disposition of the seat 16 or back 14.

Figure 5:
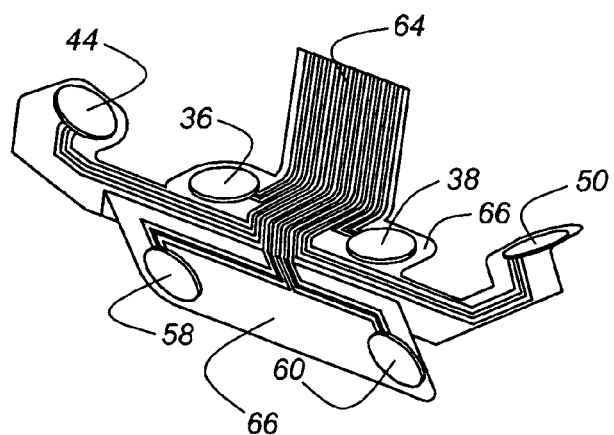
FIG. 5 is an isometric view of a dielectric sheet showing the sensors for the seat adjuster of FIG. 4.

The control panel 12 includes four hollow circular cylinders or standoffs 62 having holes through which a screw can be inserted to secure the panel 12 to the seat assembly 10. FIG. 5 shows electrical conducting leads 64 that connect the sensor terminals to a connector. The sensors are mounted on a dielectric sheet 66, which conforms to the contour of the inner surfaces of the selector areas and the bases of the depressions.

Figure 6:
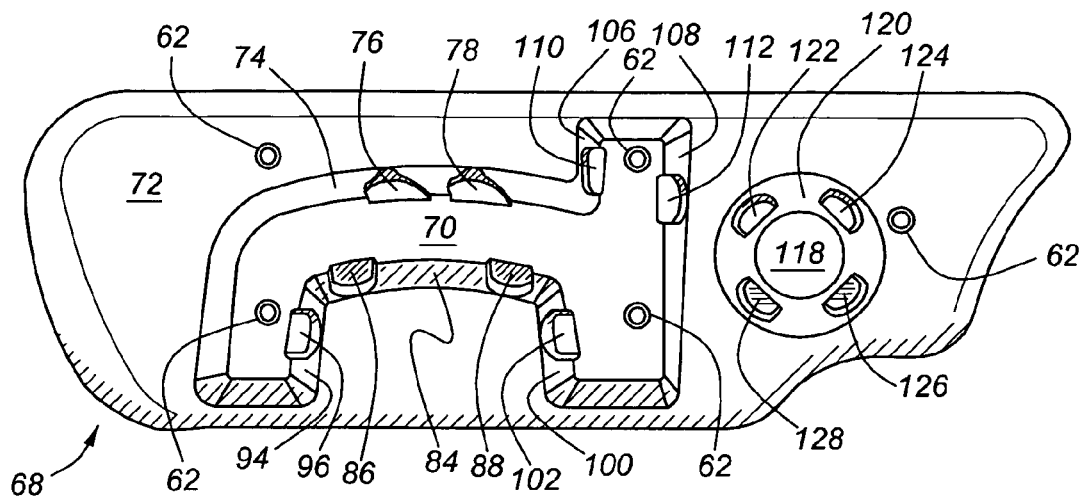
FIG. 6 is a front view of another power seat adjuster control panel having lumbar support adjustment.
Figure 7:
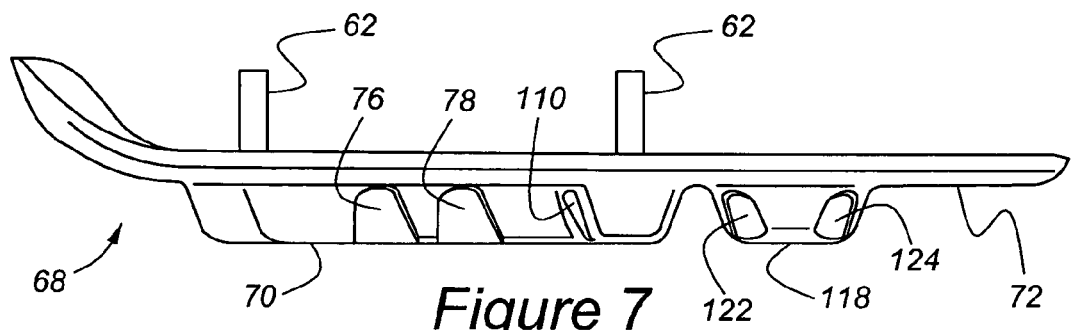
FIG. 7 is a top view of the control panel of FIG. 7.
Figure 8:
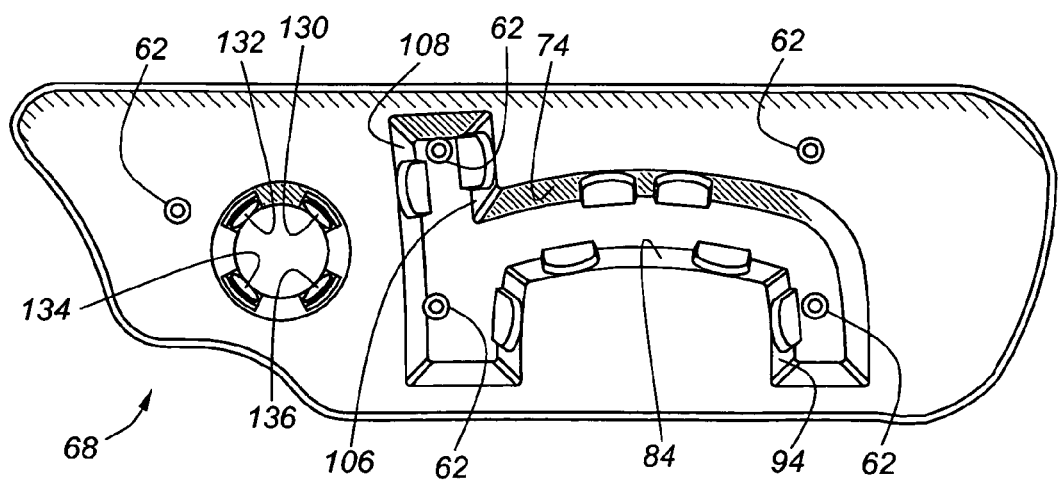
FIG. 8 is back view of the control panel of FIG. 6.

FIGS. 6-8 show an eight-way seat adjuster control panel 68, which includes an integral four-way lumbar and lateral support adjuster. In addition to producing the six adjustments described with reference to the control panel of FIGS. 2-4, the control panel 68 also actuates motors that adjust the angular displacement, forward and rearward G-H, of the seat back 14.

The seat adjuster control 68 includes a stepped panel 70 that extends laterally outward from a base panel 72, and selector areas inclined with respect to panels 70 and 72. Each selector area is bounded along opposite lateral edges by panels 70, 72 and extends along at a portion of the periphery of stepped panel 72. A selector area 74, preferably having an arcuate contour, is formed on its outer surface with hallows or depressions 76, 78, and supports sensors 80, 82, each mounted on the inner surface of area 74 opposite a respective depression 76, 78. Preferably, sensor 80 is associated with moving the front of seat 16 downward, and sensor 82 is associated with moving the rear of the seat downward. When both sensors 80, 82 are activated concurrently, the seat assembly 10 moves downward without changing the angular disposition of the seat 16 or back 14.

Another selector area 84, located across the width of panel 70 from area 74 and preferably having an arcuate contour, is formed on its outer surface with depressions 86, 88 and supports sensors 90, 92, each mounted on the inner surface of area 84 opposite a respective depression 86, 88. Preferably, sensor 90 is associated with moving the front of seat 16 upward, and sensor 82 is associated with moving the rear of the seat upward. When both sensors 80, 82 are activated concurrently, the seat assembly 10 moves upward without changing the angular disposition of the seat 16 or back 14.

A rearward facing selector area 94 is formed on its outer surface with a depression 96 and supports a sensor 98 secured to its inner surface. Preferably, sensor is associated with moving the seat assembly 10 forward. A forward facing selector area 100 is formed on its outer surface with a depression 102 and supports a touch sensor 104, which preferably is associated with moving the seat assembly 10 rearward.

The seat adjuster control 68 further includes forward and rearward-facing selector areas 106, 108, respectively, formed on each of their outer surfaces with a depression 110, 112, each area supporting a touch sensor 114, 116 secured to its inner surface. Sensor 114 is preferably associated with tilting or articulating the seat back 14 rearward, and sensor 116 is associated with tilting the seat back 14 forward.

Figure 9:
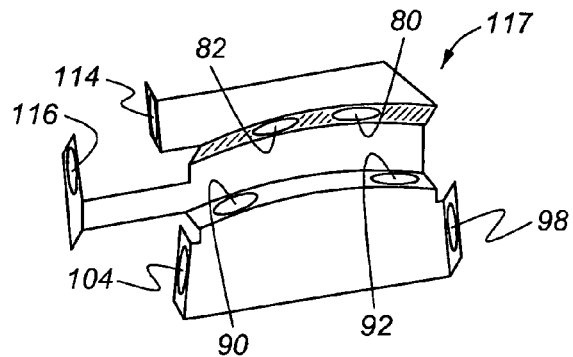
FIG. 9 is an isometric view of a dielectric sheet located on the inner surface of the control panel of FIG. 8.

The control panel 68 includes four hollow circular cylinders or standoffs 62 having holes through which a screw can be inserted to secure the panel 68 to the seat assembly 10. FIG. 9 shows a dielectric sheet 117 that is located on the inner surface of controller 68. Each sensor is mounted on sheet 117 such that one sensor is located at the base of each depression at the inner surface of the control panel. A dielectric sheet 117, similar to that shown in FIG. 5, includes electrical conducting leads connected to the sensors and a connector that engages leads at the end of the cable.

The four-way lumbar and lateral support adjuster, located rearward from panel, includes a stepped circular panel 118 that extends laterally outward from panel 72, and a conical selector band between panels 72, 118 and surrounding the periphery of panel 118. The outer surface of band 120 is formed with four angularly spaced depressions 122, 124, 126, 128. The inner surface of band 120 supports four touch sensors 130, 132, 134, 136, one sensor located at each depression and associated with an adjustment of a lumbar support 18, 20 or a lateral support 22, 24. The seat assembly 10 includes pneumatically compressible bladders, one bladder located on each lateral side 22, 24 of the seat occupant, a third bladder 20 located in the back 14 at the elevation of the occupant's lower back, and a fourth bladder located in the back 14 at the elevation of the occupant's upper back.

Two touch sensors activate the lateral support bladders 22, 24 causing the bladder corresponding to each sensor to expand and fill to a controllable degree while the corresponding sensor is activated, and to decompress or empty while the sensor is next reactivated. Another touch sensor activates the lower lumbar bladder 20 causing the bladder to expand or fill to an acceptable degree when sensor 92 is activated, thereby providing increased support to the occupant's back. When that touch sensor is next reactivated, bladder 20 is vented and contracts providing less support to the seated occupant. Similarly, a touch sensor activates the upper lumbar bladder 18 causing the bladder to expand when the sensor is activated and to empty when the sensor is reactivated.

Figure 10:
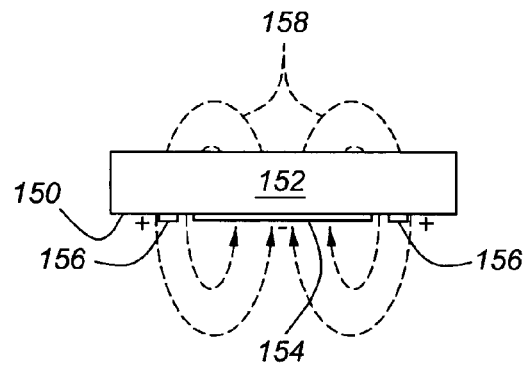
FIG. 10 is a schematic diagram of a field effect sensor mounted on a dielectric control panel.

FIG. 10 shows schematically the components of a typical field effect sensor secured to a surface 150 of a dielectric sheet 152 that is located on the inner surface of the control panel 12, 68 adjacent the base of a depression, the location being manually accessible to the seat adjuster operator. Each sensor includes a rectangular inner pad 154, at negative electric potential, encircled by an outer ring 156 at positive potential. Electric sensor fields 158 between the ring 156 and pad 154 surround the dielectric sheet 152 and extend into the space adjacent the associated depression formed on the outer surface of the control panel 12, 68. A power source 160 at about 5V is connected to each sensor pad 154, and each sensor ring 156 is connected to a microcontroller 162, as shown in FIG. 11.

Although the depressions are sized to accommodate a fingertip of an operator while selecting a seat adjustment, tactile contact between the finger and the depression is not essential to adjust the seat. The touch sensors produce an electric field to detect an object, such as a fingertip of an operator that moves into the electric field and changes the electric potential of the field. Each sensor's output, representing a change in the electric field intensity or potential associated with a user's adjustment of the seat, lateral support or a lumbar support, is supplied as input to the microcontroller 162.

Field effect sensors suitable for a seat adjuster according to this invention are available commercially from Material Sciences Corporation and Lear Electrical Systems Division. Other non-contact sensors using piezoelectric or capacitive technology, however, may be substituted for the field effect sensors.

Figure 11:
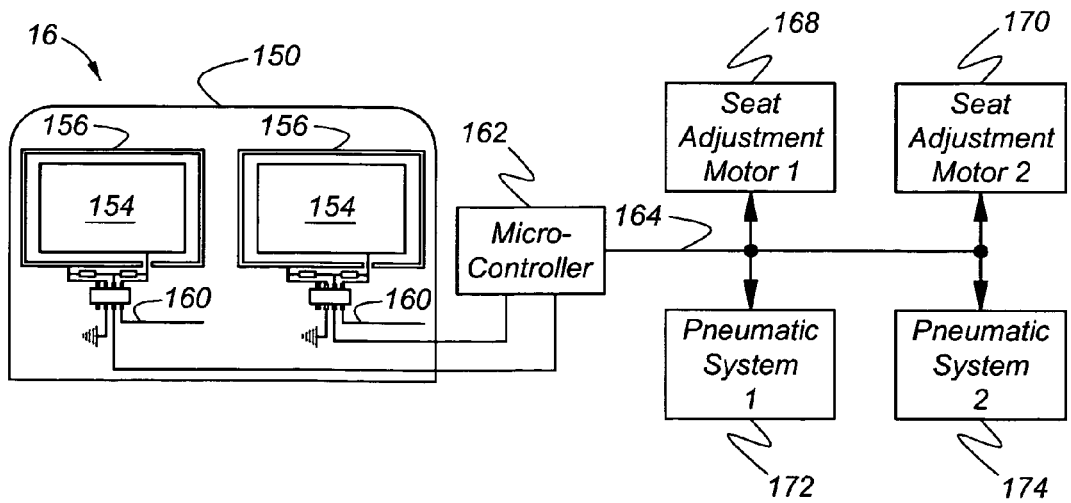
FIG. 11 is a schematic diagram of an electric system for automatically adjusting the seat.

FIG. 11 illustrates a schematic diagram of an electrical system for activating the motors that control the seat assembly 10 in response to output signals produced by the sensors. The sensors on the seat actuator control 12, 68 are electrically connected to the microcontroller 162, which determines the seat adjustment device that corresponds to each sensor output and produces an actuating output signal to the selected adjustment device during the period while the corresponding sensor is actuated. A multiplex bus 164 carries output signals from the microcontroller 130 to the seat adjustment actuation device associated with the selected sensor, i.e., seat adjustment motors 168, 170 and pneumatic systems 172, 174 containing a source of pressurized air and a valve, through which pressure in the lumbar and lateral support bladders is increased and vented. The multiplexing bus 164 minimizes the required number of communication lines.

Although the seat adjuster control has been illustrated and described with reference to operation by the left hand in a vehicle equipped with left hand drive, the control is as well suited for operation by the right hand in a right-hand drive vehicle.

The depressions, provide on the outer surface of the control, a visual and tactile indication of the corresponding sensor's location on the inner surface of the control panel. The location of each depression on the stepped, inclined surfaces of the control corresponds intuitively to the function produced by the corresponding sensor. For example, sensors that cause the seat assembly 10 and the seat front and back to move upward are located on lower surfaces of the control panel; sensors for moving the seat assembly 10 and the seat front and back downward are located on upper surfaces; the seat assembly moves forward when a sensor located on a rear facing surface is actuated, and rearward when a sensor located on a forward facing surface is actuated. Preferably the seat adjuster is molded or cast in a single unit of synthetic polymer materials.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A controller for selecting adjustment of a power seat, comprising:
    a seat adjuster including a base panel, an stepped panel laterally offset from a surface of the base panel, selector areas inclined with respect to and extending between the base panel and the stepped panel and along at least a portion of a periphery of the stepped panel, multiple mutually-spaced depressions formed on an outer surface of the selector areas, and contactless sensors, each sensor secured to an inner surface of a selector area at a depression, for selectively producing a signal representing a seat adjustment function.

2. The controller of claim 1 wherein a seat assembly for use with the controller includes a seat surface having a front and a rear, and the seat adjuster further includes:
    a first selector area having an upward facing outer surface;
    a first sensor secured to the first selector area and associated with downward rotational adjustment of the front of the seat; and
    a second sensor secured to the first selector area rearward of the first sensor, and associated with downward rotational adjustment of the rear of the seat.

3. The controller of claim 1 wherein the seat adjuster further includes:
    a first selector area having an upward facing outer surface;
    a second selector area located forward of the first selector area, inclined upward and forward from the first selector area, and having a rearward facing outer surface; and
    a third sensor secured to the second selector area and associated with forward displacement adjustment a seat assembly.

4. The controller of claim 1 wherein the seat adjuster further includes:
    a first selector area having an outer surface facing upward;
    a third selector area located rearward of the first selector area, inclined upward and rearward from the first selector area, and having a forward facing outer surface; and a fourth sensor secured to the third selector area and associated with rearward displacement adjustment of a seat assembly.

5. The controller of claim 1 wherein a seat assembly for use with the controller includes a seat surface having a front and a rear, and the seat adjuster further includes:
a first selector area having an outer surface facing upward;
a fourth selector area located on a laterally opposite edge of the stepped panel from the location of the first selector area, having a downward facing outer surface;
a fifth sensor secured to the fourth selector area and associated with upward rotational adjustment of the front of the seat; and
a sixth sensor secured to the fourth selector area, located rearward from the fifth sensor, and associated with upward rotational adjustment of the rear of the seat.

6. The controller of claim 1, wherein a seat assembly for use with the controller includes a seat surface having a front and a rear, and the seat adjuster further includes:
a first selector area having an upward facing outer surface;
a first sensor secured to the first selector area and associated with downward rotational adjustment of the front of the seat;
a second sensor secured to the first selector area rearward of the first sensor, and associated with downward rotational adjustment of the rear of the seat;
a second selector area located forward of the first selector area, inclined upward and forward from the first selector area, and having a rearward facing outer surface;
a third sensor secured to the second selector area and associated with forward displacement adjustment the seat assembly;
a third selector area located rearward of the first selector area, inclined upward and rearward from the first selector area, and having a forward facing outer surface;
a fourth sensor secured to the third selector area and associated with rearward displacement adjustment of the seat assembly;
a fourth selector area located on a laterally opposite edge of the stepped panel from the location of the first selector area, having a downward facing outer surface;
a fifth sensor secured to the fourth selector area and associated with upward rotational adjustment of the front of the seat; and
a sixth sensor secured to the fourth selector area, located rearward from the fifth sensor, and associated with upward rotational adjustment of the rear of the seat.

7. The controller of claim 1, wherein the sensors field effect sensor, and further comprising:
a dielectric sheet to which the sensors are secured; and
electrical leads secured to the dielectric sheet and connected to the sensors.

8. The controller of claim 1 wherein the control panel further includes cylindrical tubes for engaging holes formed in a surface of a power seat assembly, whereby the seat adjuster is secured to the seat assembly.

9. The controller of claim 1 wherein the sensors are any of field effect sensors, piezoelectric sensors and capacitive sensors.

10. A controller for selectively adjusting a power seat, comprising:
a seat adjuster including a base panel base, a stepped panel laterally offset from a surface of the base panel, selector areas inclined with respect to and extending between the base panel and the stepped panel and along at least a portion of a periphery of the stepped panel, multiple mutually-spaced depressions formed on an outer surface of the selector areas, and contactless sensors, each sensor secured to an inner surface of a selector area at a depression, for selectively producing a signal representing a seat adjustment function; and
a lumbar adjuster located on the base panel and rearward from the stepped panel.

11. The controller of claim 10 wherein the lumbar adjuster includes a second stepped panel laterally offset from a surface of the base panel, a selector band inclined with respect to and extending between the base panel and the stepped panel and along at least a portion of a periphery of the second stepped panel, multiple mutually-spaced depressions formed on an outer surface of the selector band, and contactless sensors, each sensor secured to an inner surface of a selector band at a depression, for selectively producing a signal representing a lumbar seat adjustment function.

12. The controller of claim 10 wherein a seat assembly for use with the controller includes a seat surface having a front and a rear, and the seat adjuster further includes:
a first selector area having an upward facing outer surface;
a first sensor secured to the first selector area and associated with downward rotational adjustment of the front of the seat; and
a second sensor secured to the first selector area rearward of the first sensor, and associated with downward rotational adjustment of the rear of the seat.

13. The controller of claim 10 wherein the seat adjuster further includes:
a first selector area having an upward facing outer surface;
a second selector area inclined downward with respect to the first selector area, and having a rearward facing outer surface; and
a third sensor secured to the second selector area and associated with forward displacement adjustment a seat assembly.

14. The controller of claim 10 wherein the seat adjuster further includes:
a first selector area having an outer surface facing upward;
a third selector area inclined downward with respect to the first selector area, and having a forward facing outer surface; and
a fourth sensor secured to the third selector area and associated with rearward displacement adjustment of a seat assembly.

15. The controller of claim 10 wherein a seat assembly for use with the controller includes a seat surface having a front and a rear, and the seat adjuster further includes:
a first selector area having an outer surface facing upward;
a fourth selector area located on a laterally opposite edge of the stepped panel from the location of the first selector area, having a downward facing outer surface;
a fifth sensor secured to the fourth selector area and associated with upward rotational adjustment of the front of the seat; and
a sixth sensor secured to the fourth selector area, located rearward from the fifth sensor, and associated with upward rotational adjustment of the rear of the seat.

16. The controller of claim 10 wherein a seat assembly for use with the controller includes a back, and the seat adjuster further includes
a fifth selector area located rearward of the first selector area, having a forward facing outer surface; and
a seventh sensor secured to the fifth selector area and associated with rearward rotational adjustment of the back of the seat assembly.

17. The controller of claim 10 wherein a seat assembly for use with the controller includes a back, and the seat adjuster further includes
 a sixth selector area located rearward of the fifth selector area, having a rearward facing outer surface; and
 an eighth sensor secured to the sixth selector area and associated with forward rotational adjustment of the back of the seat assembly.

18. The controller of claim 10, wherein a seat assembly includes a back and a seat having a front and a rear, and the seat adjuster further includes:
 a first selector area having an upward facing outer surface;
 a first sensor secured to the first selector area and associated with downward rotational adjustment of the front of the seat;
 a second sensor secured to the first selector area rearward of the first sensor, and associated with downward rotational adjustment of the rear of the seat;
 a second selector area located forward of the first selector area, inclined upward and forward from the first selector area, and having a rearward facing outer surface;
 a third sensor secured to the second selector area and associated with forward displacement adjustment the seat assembly;
 a third selector area located rearward of the first selector area, inclined upward and rearward from the first selector area, and having a forward facing outer surface;
 a fourth sensor secured to the third selector area and associated with rearward displacement adjustment of the seat assembly;
 a fourth selector area located on a laterally opposite edge of the stepped panel from the location of the first selector area, having a downward facing outer surface;
 a fifth sensor secured to the fourth selector area and associated with upward rotational adjustment of the front of the seat;
 a sixth sensor secured to the fourth selector area, located rearward from the fifth sensor, and associated with upward rotational adjustment of the rear of the seat;
 a fifth selector area located rearward of the first selector area, having a forward facing outer surface;
 a seventh sensor secured to the fifth selector area and associated with rearward rotational adjustment of the back of the seat assembly;
 a sixth selector area located rearward of the fifth selector area, having a rearward facing outer surface; and
 an eighth sensor secured to the sixth selector area and associated with forward rotational adjustment of the back of the seat assembly.

19. The controller of claim 18, wherein the lumbar adjuster includes a second stepped panel extending laterally from a surface of the base panel, a selector band inclined with respect to and extending between the base panel and the stepped panel and along at least a portion of a periphery of the second stepped panel, multiple mutually-spaced depressions formed on an outer surface of the selector band, and contactless sensors, each sensor secured to an inner surface of a selector band at a depression, for selectively producing a signal representing a lumbar seat adjustment function.

20. A controller for selectively adjusting a seat having a front and a rear a seat adjuster including a base panel base, a stepped panel extending laterally from a surface of the base panel, selector areas inclined with respect to and extending between the base panel and the stepped panel and along at least a portion of a periphery of the stepped panel, multiple mutually-spaced depressions formed on an outer surface of the selector areas, and contactless field effect sensors, each sensor secured to an inner surface of a selector area at a depression, for selectively producing a signal representing a seat adjustment function;
 a lumbar adjuster located on the base panel and rearward from the stepped panel;
 a dielectric sheet to which the sensors are secured; and
 electrical leads secured to the dielectric sheet and connected to the sensors.

* * * * *